(No Model.)

H. B. BEACH & S. W. BABBITT.
TEA OR COFFEE POT.

No. 365,227. Patented June 21, 1887.

United States Patent Office.

HENRY B. BEACH AND S. WM. BABBITT, OF MERIDEN, CONNECTICUT.

TEA OR COFFEE POT.

SPECIFICATION forming part of Letters Patent No. 365,227, dated June 21, 1887.

Application filed March 14, 1887. Serial No. 230,802. (No model.)

*To all whom it may concern:*

Be it known that we, HENRY B. BEACH and S. WM. BABBITT, of Meriden, in the county of New Haven and State of Connecticut, have invented a new Improvement in Tea or Coffee Pots; and we do hereby declare the following, when taken in connection with accompanying drawings and the letters of reference marked thereon, to be a full, clear, and exact description of the same, and which said drawings constitute part of this specification, and represent, in—

Figure 1:
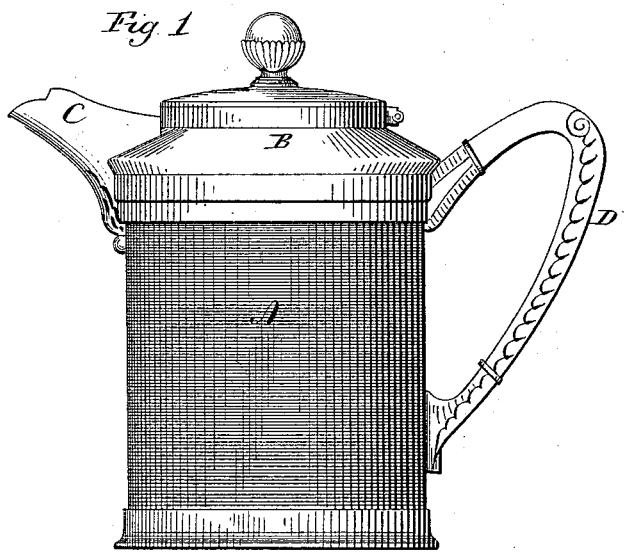
Figure 2:
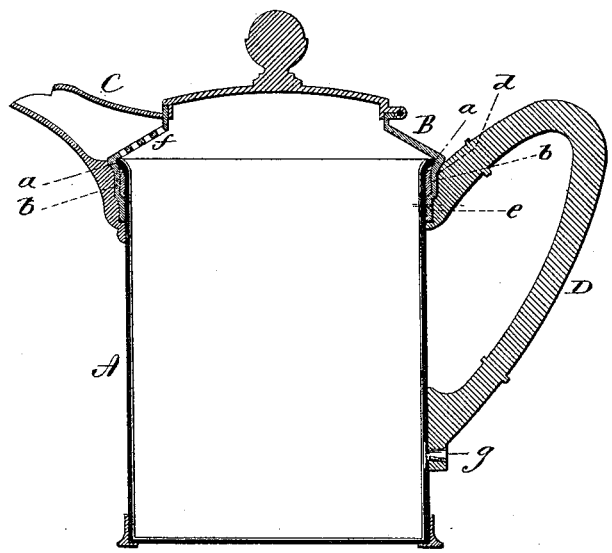

Figure 1, a side view of the pot complete; Fig. 2, a vertical central section.

This invention is an improvement in the construction of that class of tea and coffee pots in which the body of the pot is made from metal coated with a vitreous material, such as commonly called "enamel."

In this class of pots a neck is attached with a cover to close the top, and in the more general construction this neck is secured by soldering to the pot, the enamel on the body of the pot being first ground off so as to expose the metal. In other cases connections are made with a metal band on the pot below, so that the top and band are bound together by metallic connections. Again, the spout usually opens into the pot through the body, the body being perforated as a strainer into the spout. It is difficult to so enamel the pot around the perforations that the edges will be so fully protected as to prevent the fluid in the pot from working between the enamel and the metal of the pot. The action of the fluid on the metal produces oxidation and causes the enamel to flake or break from it.

The object of our invention is to construct a pot so that the top or neck may be secured thereto without the intervention of solder or connection with other part of the pot, and also to make the entrance to the pouring-spout entirely in the top above the body of the pot.

A represents the body of the pot, which may be of any desirable shape. In the illustration it is shown cylindrical. It is made from sheet metal. Around its upper edge an outwardly-projecting bead, a, is formed by turning the metal over, or the introduction of a wire, or any of the known methods of forming a bead or outward annular projection around a sheet-metal cylindrical surface. The metal body thus formed is coated upon the inside and outside in the usual manner for coating or enameling metal ware. The beaded upper edge of the pot permits a complete and perfect enameling of that edge, so that the metal will not be exposed or liable to contact with the fluid in the pot.

The top B is made to conform to the shape of the top of the pot, and the top is constructed with an outwardly-projecting annular flange to extend outside the pot, the diameter of the flange when applied being so much greater than the diameter of the exterior of the top of the pot that it may pass freely down over the bead, and so that the top will come to a rest thereon, as seen in Fig. 2.

Within the flange, and directly below the bead $a$, a suitable packing, $b$, is introduced. This may be a band of felt narrower than the depth of the flange, or of any other suitable material. After the packing has been introduced the flange is spun or struck down from the outside, so as to embrace the bead $a$, as at $d$, and close upon the packing $b$, and then below the packing the flange is worked close down upon the surface of the pot, as at $e$, so that the bead is inclosed between the top B and the struck-in portion of the flange, and so as to securely hold the top and pot together. The packing is closely compressed between the upper portion of the flange, the lower portion of the flange being worked close down upon the pot below the packing, so that the packing is completely inclosed and the work becomes of the most finished character.

Through the top above the upper edge of the body of the pot, perforations $f$ are made in the usual manner as a strainer for pouring, and upon the top at this point the spout C is secured to the top and flange, as indicated in Fig. 2. Upon the opposite side the handle D is fixed. This construction brings the opening to the spout entirely above the body of the pot, and therefore avoids cutting or perforating the metal of the body of the pot, and it also brings the strainer into nearly a horizontal plane, which we find very desirable, in that it prevents the clogging of the strainer by the tea or coffee, as the case may be, adhering thereto, as it will when the perforations are on the vertical side of the pot, their own gravity tending to clear them from the strainer when the pot stands upright.

The upper end of the handle is secured to the top or its flange by solder or otherwise; but to secure the lower end without exposing the metal of the body of the pot we introduce into the body of the pot before enameling a rivet, $g$, the head of which is upon the inside, and it extends radially outward. This is firmly secured in the metal of the body of the pot before enameling, so that the enamel completely covers the head and incloses it as a part of the body. Then the handle is secured to this rivet, say, as by soldering or otherwise. By this construction as a whole the metal of the body of the pot is so fully protected by the enamel that the metal is not liable to exposure by use, and because of the manner of closing the top upon the upper edge of the body of the pot there is no liability of leak between the top and body, and we produce a pot of the most perfect character.

By the term "projecting bead," as applied to the upper edge of the body as a means for securing the top, we wish to be understood as including any suitable projection or under-cut.

We have described the invention as applied to tea or coffee pots; but it will be understood that it is applicable to analogous articles of table-service.

We claim—

1. A tea or coffee pot consisting of the body A, made from sheet metal, with an outwardly-projecting bead around its upper edge, the said body coated with enamel, combined with a metal top, B, constructed with a downwardly-projecting flange outside said bead, and a packing introduced between said flange and said bead, and the flange closed down upon the bead and packing onto the body of the pot, substantially as described.

2. A tea or coffee pot consisting of the body A, having a metal top attached thereto, the said top provided with a cover and constructed with a spout above the body of the pot and below the cover, the said top having perforations at the spout and opening into it above the body of the pot and below the cover, substantially as described.

3. In a tea or coffee pot in which the body is made from sheet metal enameled upon its outer and inner surface, a rivet, $g$, fixed in the body of the pot before enameling, said rivet projecting outward from the body of the pot as a means for securing the handle to the pot, substantially as described.

HENRY B. BEACH.
S. WM. BABBITT.

Witnesses:
 F. A. BERNARD,
 S. B. BEACH.